United States Patent [19]
Wood

[11] Patent Number: 5,005,212
[45] Date of Patent: Apr. 2, 1991

[54] INTERFERENCE SUPPRESSION IN OPTICAL COMMUNICATION SYSTEMS

[75] Inventor: Thomas H. Wood, Holmdel, N.J.

[73] Assignee: AT&T Bell Laboratories, Murray Hill, N.J.

[21] Appl. No.: 449,039

[22] Filed: Dec. 12, 1989

[51] Int. Cl.$^5$ .......................... G02F 1/00; G02F 2/00; H01S 3/00

[52] U.S. Cl. .................. 455/606; 455/606; 455/612

[58] Field of Search .............. 455/606, 607, 712; 370/1, 3, 32.1; 350/96.16, 96.11; 379/416, 417; 375/3

[56] References Cited

U.S. PATENT DOCUMENTS

| | | | |
|---|---|---|---|
| 4,627,105 | 12/1986 | Ohashi et al. | 370/3 |
| 4,709,414 | 11/1987 | So et al. | 455/607 |
| 4,893,300 | 1/1990 | Carlin et al. | 370/3 |

OTHER PUBLICATIONS

Bidirectional Video Transmission System Using a Single Optical Fiber, Ichida et al., Proceedings of the Optical Communication Conference, Amsterdam, Netherlands (17-19 Sep. 1979), pp. 20.3-1-20.3-4.

Journal of Lightwave Technology, vol. 7, No. 6, Jun. 1989, "Wide-Band Lightwave Distribution System Using Subcarrier Multiplexing", T. E. Darcie, et al, pp. 997-1005.

Journal of Lightwave Technology, vol. 7, No. 11, Nov. 1989, "Two Fibers or One? . . . "—L. J. Baskerville, pp. 1733-1740.

Journal of Lightwave Technology, vol. 7, No. 11, Nov. 1989, "Subcarrier Multiplexed Lightwave System Design Considerations for Subscriber Loop Applications", W. I. Way, pp. 1806-1818.

Primary Examiner—Reinhard J. Eisenzopf
Assistant Examiner—Kinfe-Michael Negash

[57] ABSTRACT

A technique for suppressing mutually induced interference between spatially separate channels which are positioned nearby one another during a first portion thereof to cause interference therebetween, and are positioned relatively far from one another during a second portion thereof to avoid mutually induced interference therebetween. Energy in one of the channels is converted to a signal which is distinguishable by code, frequency, or time, from energy in the other channel. The converted signal is then transmitted in the second portion of one of the channels. Then, any interference in the other channel caused by the converted signal can be suppressed by suppressing the distinguishable energy from the converted signal.

15 Claims, 3 Drawing Sheets

INTERFERENCE SUPPRESSION IN OPTICAL COMMUNICATION SYSTEMS

BACKGROUND OF THE INVENTION

1. Field of the Invention

This invention relates to optical transmission systems, and more particularly, to a technique for suppressing mutually induced interference between closely spaced electrical signals on a Photonic Integrated Circuit (PIC).

2. Description of the Prior Art

Optical transmission media have emerged as the preferred transmission media. Relatively large bandwidth, low cost and ease of implementation are just a few of the reasons which have contributed to making optical media so preferable.

Use of optical transmission media usually requires utilization of electro-optical (E/O) converters to convert an electrical input signal into an optical signal for transmission over an optical medium. For full duplex communications, the optical medium may comprise a separate fiber for each direction, or alternatively, may utilize a single fiber and some multiplexing scheme. One such system is described in "Two Fibers or One? (A Comparison of Two-Fiber and One-Fiber Star Architectures for Fiber-to-the Home Applications)" by Loria Baskerville in *Journal of Lightwave Technology*, Vol. 7, No. 11, Nov. 1989, and is shown in block diagram form in FIG. 1. The system of FIG. 1 comprises (a) Electro-optical (E/O) converters 101-102, (b) Optical-Electro (O/E) converters 103-104, (c) optical transmission medium 105, (d) directional couplers 106-107, and (e) shielding 108-109, which is not shown in the above reference but is normally utilized in such systems. E/O converter 101 and O/E converter 104 are normally implemented on a single circuit card, as shown in FIG. 1. SImilarly, E/O converter 102 and O/E converter 103 are also normally implemented on a single circuit card. The system of FIG. 1 is intended to provide full duplex communications between end users.

In operation, an electrical input signal arrives at E/O converter 101 and is used to drive a laser having an optical output frequency band centered at F1. The optical output signal is then transmitted over optical medium 105 and received at O/E converter 103, which converts it back to an electrical signal and forwards the electrical signal to an end user equipment. Similarly, E/O converter 102 receives an electrical input signal which it converts to an optical output signal having a frequency band centered at F2. The optical output signal is then transmitted over optical medium 105 from E/O converter 102 to O/E converter 104, where it is converted back to an electrical signal.

Each receiver must contend with interference from two different sources. First, as FIG. 1 shows, light which is transmitted from E/O converter 101 enters optical medium 105 by means of directional coupler 107. However, a portion of this light is reflected back toward O/E converter 104 due to imperfect splicing in the fiber, Rayleigh scattering, imperfections in the directional couplers, or other imperfections in the system. These reflections cause interference in O/E converter 104. This problem has been solved in the prior art by, for example, employing an optical filter between directional coupler 107 and O/E converter 104 which suppresses F1 and passes F2. Alternatively, a wavelength selective directional coupler could be employed. Second, electrical signals entering E/O converter 101 interfere, due to undesirable electromagnetic coupling, with electrical signals exiting O/E converter 104, and cause interference. This second problem has ben solved in the prior art through the use of shielding 108, which serves to attenuate crosstalk between electrical signals exiting O/E converter 104 and electrical signals entering E/O converter 101. E/O converter 102 and O/E converter 103 interfere in a similar manner, with a similar solution as shown in FIG. 1.

The use of shielding 108 and 109 is disadvantageous for several reasons. First, it has recently become possible to fabricate both an E/O converter and an O/E converter on a single chip, known as Photonic Integrated Circuit (PIC). PICs provide significant cost and space savings. Further, alignment of optical waveguides on a PIC can be done photolithographically, rather than manually, thereby making exact alignment easier. Because of space constraints on the PIC, however, it is extremely difficult to implement proper shielding. Further, the shielding used in current systems does not provide the desired amount of attenuation, and thus, there always remains some crosstalk and interference. The shielding problem is extremely severe on a PIC because the O/E converter and the E/O converter are so closely located, and space is not available to apply the shielding. Thus, standard techniques for eliminating crosstalk between the electrical signals work only in the prior art technology, e.g., on a circuit card, and are of little value in state of the art PIC technology. This problem has greatly hindered the development of PICs.

The problem that remains in the prior art is to provide a method of reducing the interference between the electrical signals entering the E/O converter and the electrical signals exiting the O/E converter, where space limitations exist, such as on a PIC.

SUMMARY OF THE INVENTION

The foregoing problem in the prior art has been solved in accordance with the present invention which relates to a technique for suppressing mutually induced interference between closely located electrical transmission paths on, for example, a PIC.

It is a particular aspect of one embodiment of the invention to eliminate the interference between the electrical signal input to an E/O converter and the electrical signal output from an O/E converter which propagate adjacent to each other on a PIC. In accordance with the invention, the electrical signal used to drive the E/O converter is first electrically modulated before entering the PIC to produce a new electrical signal in a different frequency band from the original electrical signal. The new electrical signal is then supplied to the PIC and used to drive the E/O converter. This technique guarantees that the signal exiting from the O/E converter and the signal entering the E/O converter are in separate frequency bands, at least while they are both on the PIC. Any crosstalk can then be eliminated with electrical filtering techniques which can be implemented external to the PIC. In other embodiments, the electrical modulator is replaced with an encoder, and the interference is suppressed using a selective decoder, rather than the filtering techniques referred to above.

DETAILED DESCRIPTION

Figure 1:
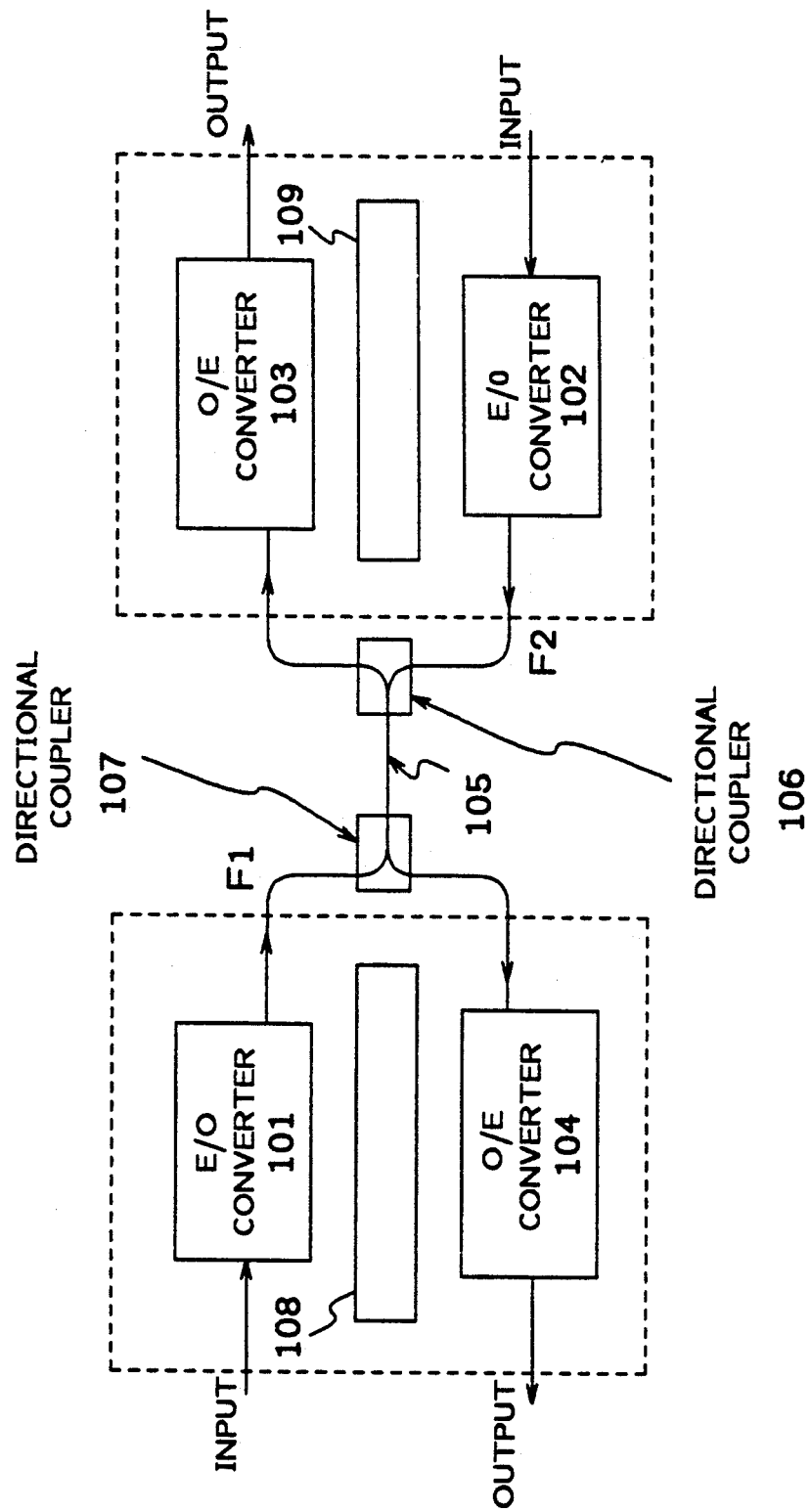
FIG. 1 shows a typical optical communications system of the prior art.
Figure 2:
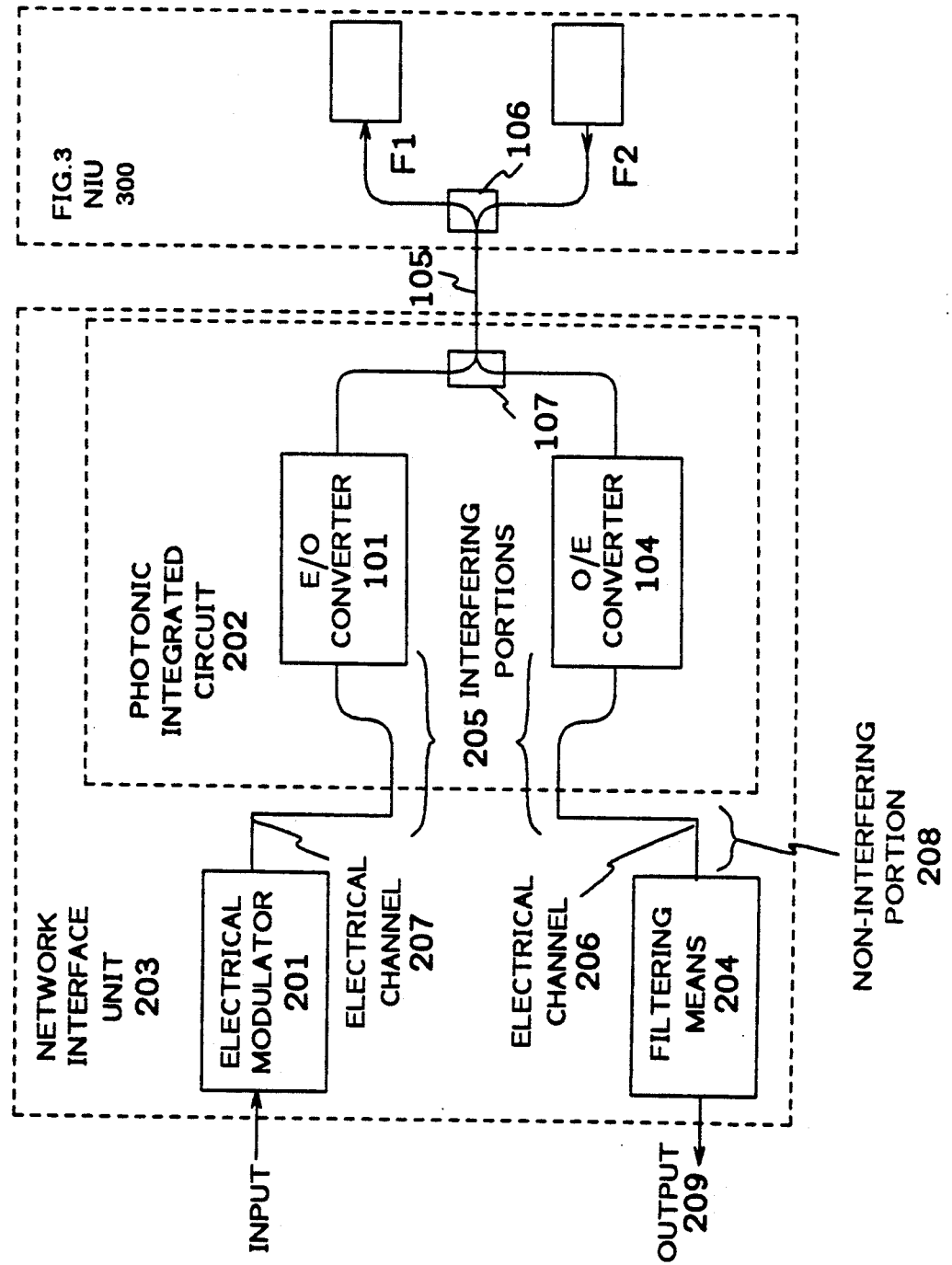
FIG. 2 shows an optical communications system utilizing an improved Network Interface Unit (NIU) in accordance with the present invention.

FIG. 2 shows a block diagram of an exemplary optical communication system, utilizing a Network Interface Unit (NIU) 203 in accordance with the present invention. The NIU 203 includes (a) Electro-optical (E/O) converter 101, (b) O/E converter 104, (c) filtering means 204, and (d) electrical modulator 201. Other labeled portions of FIG. 2 will be explained hereafter. The system of FIG. 2 is shown without shielding, however, shielding may be implemented in conjunction with the present technique to further improve performance.

In operation, an input electrical signal is received at electrical modulator 201 which modulates the input electrical signal to a first predetermined frequency band to create a new electrical output signal. The new electrical output signal is then sent to E/O converter 101, via electrical channel 207, where it is converted to an optical signal centered at the exemplary frequency band F1, for transmission over optical waveguide 105.

Optical signals to be received by NIU 203, which are transmitted from other NIUs in the system, are first received in frequency band F2 from optical transmission medium 105 and directional coupler 107 by O/E converter 104 and are converted into electrical output signals. The electrical output signal-s are then transmitted over electrical channel 206 to filtering means 204. Interference in channel 206 is caused by the electrical signal in channel 207 in two ways. First, while traveling along portion 205 of electrical channel 206, the electrical signal in channel 206 picks up interference from the other electrical signal, previously discussed, which is travelling on portion 205 of electrical channel 207. Second, light emitted from E/O converter 101 at frequency band F1, which is an optical version of the electrical signal on channel 207, is partially reflected back to O/E converter 104. However, once the O/E converted signal traveling on electrical channel 206 reaches portion 208 of electrical channel 206, substantially no more interference is picked up from the signal on electrical channel 207 from either of the two previously mentioned sources. Portion 208 of electrical channels 207 and 206 may be prevented from interfering with each other by shielding or by spacing them for enough apart. Portion 208 is disposed off the PIC as shown, so severe space limitation is not a problem. It should also be noted that interfering portion 205 may extend off the PIC.

Filtering means 204 is tuned to suppress substantially all energy in the first predetermined frequency band and, ideally, should be disposed anywhere only the non-interfering portion 208 of electrical channel 206. Therefore, filtering means 204 outputs an electrical signal on output 209 which is substantially free from interference caused by the signal on electrical path 207.

Note the dashed outline in FIG. 2 labeled Photonic Integrated Circuit (PIC) 202. When the E/O converter and the O/E converter are on the same PIC, the method is particularly advantageous, due to the fact that prior art shielding methods, previously discussed, are prohibited by a severe limitation in available space. By utilizing the inventive technique, interference caused on PIC 202 is eliminated external to PIC 202, where more space is available to implement the necessary hardware.

Figure 3:
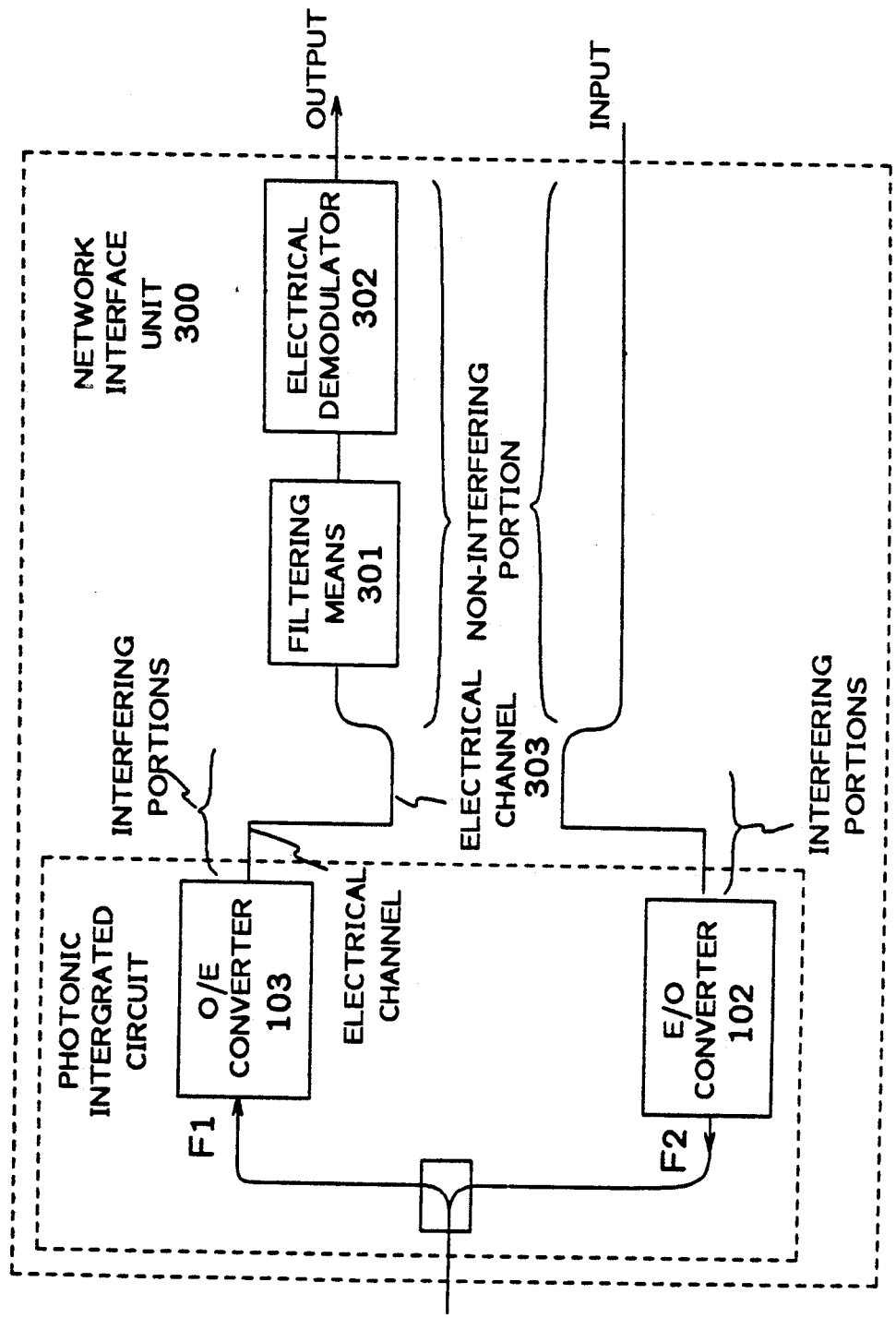
FIG. 3 shows an NIU which may be connected to the NIU of FIG. 2.

FIG. 3 shows an NIU 300 comprising similar components as those already discussed in FIG. 2. The NIU of FIG. 3 is suitable for use with the NIU of FIG. 2. More particularly, optical signals transmitted by E/O converter 101 of FIG. 2 are received by O/E converter 103 of FIG. 3 and are converted to an electrical signal, which is output by O/E converter 103 onto electrical channel 303. The frequency band of this output electrical signal will be determined by electrical modulator 201 of FIG. 2. Filtering means 301 then suppresses energy picked up from the electrical signal being used to drive E/O converter 102. Finally, electrical demodulator 302 demodulates the signal, thereby providing an output signal substantially free from interference.

E/O converter 102 is used to convert an electrical signal to an optical signal for transmission to O/E converter 104 of FIG. 2. O/E converter 104 of FIG. 2 then converts the received optical signal to an electrical signal for transmission over electrical channel 206 as previously described.

It is to be understood that the example described herein is for illustrative purposes only and that other variations of the invention can be easily constructed without violating the spirit or scope thereof. For example, electrical modulator 201 could be replaced with an encoder, such as a spread spectrum encoder. The spread spectrum encoder would distribute the energy in the electrical input signal over a large bandwidth, thereby reducing the amount of energy present in the original bandwidth. In this case, filtering means 204 would be required to suppress all energy which was outside the original bandwidth, and thus, would suppress most of the energy from the interfering signal. Filtering means 204 may also include a spread spectrum decoder for decoding a spread spectrum signal being received by NIU 203. Analogous changes to other NIUs in the system, such as NIU 300 of FIG. 3, also would be made. In general, any technique that distinguishes the energy in the two electrical signals and subsequently suppresses a larger fraction of the energy in the interfering signal than in the desired signal will suffice. It is also possible to include two modulators, one for each direction, and to convert the electrical signals into two different sates rather than converting one of the electrical signals and leaving the second alone as was described previously herein. Filtering means 204 is understood to be any device capable of reducing the ratio of interfering energy to desired energy. Again, analogous changes to other NIUs in the system would have to be made. Both F1 and F2 could even be made equal to each other, as is the case in some systems. The electrical modulator of FIG. 2 could even by eliminated if the incoming electrical signal to the NIU was already in a state that was distinguishable from the electrical signal output from O/E converter 104.

I claim:

1. A network interface unit (NIU) for interfacing an electrical device to an optical network, said NIU comprising:

first and second electrical transmission lines (206,207), arranged to effectuate substantial electromagnetic coupling therebetween;

electro-optical converting means (101) connected to said first electrical transmission line for receiving a first electrical signal and converting the first electrical signal into a first optical signal for transmission to the optical network;

optical-electro converting means (104) for (a) receiving a second optical signal from the optical network, (b) converting said second optical signal into a second electrical signal, and (c) transmitting said second electrical signal via the second electrical transmission line; and means connected to said second electrical transmission line for increasing a ratio of energy in the second electrical signal to energy electromagnetically coupled from said first electrical transmission line to said second electrical transmission line.

2. An NIU according to claim 1 wherein each of said first and second electrical transmission lines includes:

a first portion (205) and a second portion (208), where said first portions are positioned relative to each other so that an electrical signal present in the first portion of one of said electrical transmission lines is interferingly coupled to the first portion of the other of said electrical transmission lines, and said second portions are positioned relative to each other so that an electrical signal present in the second portion of one of said electrical transmission lines is substantially uncoupled to the other of said transmission lines, and wherein said means for increasing a ratio is connected to said second portion of said second electrical transmission line.

3. An NIU according to claim 1 further comprising electrical converting means connected to at least one of said electrical transmission lines for converting an electrical signal from a first predetermined state to a second predetermined state.

4. An NIU according to claim 2 further comprising electrical converting means connected to at least one of said electrical transmission lines for converting an electrical signal from a first predetermined state to a second predetermined state.

5. An NIU as set forth in claim 3 wherein
the electrical converting means includes a modulator for receiving a signal in a predetermined first frequency band and converting the signal to a predetermined second frequency band.

6. An NIU as set forth in claim 4 wherein
the electrical converting means includes a modulator for receiving a signal in a predetermined first frequency band and converting the signal to a predetermined second frequency band.

7. An NIU as set forth in claim 3 wherein the electrical converting means includes an encoder for receiving the first electrical signal and encoding the first electrical signal into an encoded signal with a predetermined code.

8. An NIU as set forth in claim 4 wherein the electrical converting means includes an encoder for receiving the first electrical signal and encoding the first electrical signal into an encoded signal with a predetermined code.

9. An NIU according to claim 1, 2, 3, 4, 5, 6, 7 or 8 wherein said electro-optical converting means and said optical-electro converting means are fabricated adjacent to each other on a single Photonic Integrated Circuit (PIC).

10. An NIU according to claim 1, 2, 3, 4, 5, 6, 7 or 8 connected to an optical directional coupler.

11. An NIU according to claim 9 connected to an optical directional coupler.

12. A method of providing immunity against interference in two spatially separate channels comprising the steps of:

(a) converting all energy in a signal to be transmitted on a first one of the spatially separate channels into a first predetermined state, for generating a converted electrical signal, (b) transmitting the converted electrical signal along the first spatially separate channel, (c) increasing, in the second of the spatially separate channels, a ratio of energy in a second predetermined state which is propagating along the second of the two spatially separate channels to interference caused by energy in the first predetermined state.

13. The method of claim 12 wherein in step (a), the predetermined first state is achieved by shifting the energy into a predetermined first frequency band.

14. The method of claim 12 wherein in step (a), the predetermined first state is achieved by encoding the electrical signal with a predetermined code.

15. The method of claim 12, 13 or 14, wherein the spatially separate channels are positioned relative to each other to cause substantial coupling therebetween in a first portion of the length thereof, and are positioned relative to each other so as not to cause substantial coupling therebetween in a second portion of the length thereof.

* * * * *